United States Patent [19]

Skarky

[11] 4,272,794
[45] Jun. 9, 1981

[54] DISC MEMORY DRIVE WITH IMPROVED CARTRIDGE HANDLING

[75] Inventor: Loren D. Skarky, Bethany, Okla.

[73] Assignee: Magnetic Peripherals Inc., Minneapolis, Minn.

[21] Appl. No.: 949,845

[22] Filed: Oct. 10, 1978

[51] Int. Cl.$^2$ .................... G11B 17/04; G11B 23/02
[52] U.S. Cl. ..................................... 360/97; 360/133
[58] Field of Search .................... 360/97–99, 360/133; 274/9 B, 39 A; 346/137

[56] References Cited

U.S. PATENT DOCUMENTS

| | | | |
|---|---|---|---|
| 3,593,327 | 7/1971 | Shill | 360/97 |
| 3,800,325 | 3/1974 | O'Brien | 360/98 |
| 3,815,150 | 6/1974 | Stoddard et al. | 360/99 |
| 3,899,794 | 8/1975 | Brown | 360/97 |

Primary Examiner—Robert S. Tupper
Attorney, Agent, or Firm—Edward L. Schwarz

[57] ABSTRACT

A disk memory drive mechanism for accepting a disk memory module from a front-located port and conveying it to a seated position on the spindle, and for detaching it from the spindle and conveying it back to the loading port for removal. The module-conveying mechanism is activated by opening and closing the door for the loading port which seals it from the ambient air.

12 Claims, 5 Drawing Figures

DISC MEMORY DRIVE WITH IMPROVED CARTRIDGE HANDLING

BACKGROUND OF THE INVENTION

For relatively large-scale nonvolatile storage, the disk memory is the favored data processing peripheral device. The typical modern disk drive has a detachable medium of the type whose recorded information can be recalled upon reattaching the disk to the drive.

Such drives have the disk modules or cartridges attached and detached by lifting or removing a panel or cover at the top of the drive unit, thereby exposing the spindle which rotates the disks, and the transducer assembly which reads and writes data on the disk surfaces. Such top loading drive units make it possible for the operator to manually attach the disk module to the drive unit in a straightforward fashion.

However, there are disadvantages with top loading drive units. Many installations have a large number of such units, and the top loading feature precludes stacking one on the other. Furthermore, top loading designs have a pivoted cover which requires a substantial amount of space directly above to which the cover pivots when a module is being mounted or dismounted. Accordingly, there has been a long felt need, not wholly satisfied to date, for a disk memory drive unit which accepts modules through a port on a vertical surface of the unit.

BRIEF DESCRIPTION OF THE INVENTION

To satisfy this need, we have designed a disk memory module and a drive unit employing a bottom hinged door which closes a port on the vertical front surface of a disc memory unit. The module to be used with the drive unit is of the type which has an opening in the bottom exposing the disk hub. The disk hub has a feature by which it can be attached to the drive unit spindle. The housing of the module has a feature by which the module may be supported and transported within the drive.

Opening the door which seals the loading port exposes the port sufficiently to allow the module to be inserted in it. Within the drive unit is a module support with which the support feature of the housing can mate. The loading port door, hinged at the bottom to the front panel of the unit is connected by a linkage to the module support. Opening the door causes the linkage connected between the door and the module support to shift the module support from a position adjacent the drive unit spindle to a position adjacent the loading port. A transport mechanism supports the module support in these two positions and guides and supports it between them.

To load a module onto the drive unit, the door is opened, the module is slipped through the port, and the housing's support feature is mated with the module support. Closing the door causes the module in its support to be carried by the transport means onto the spindle allowing the disk hub to mate by its spindle attachment feature to the drive unit spindle. The unit can then be activated and the disc within the module written and read in the conventional fashion. To detach the module, the door is opened causing the linkage to detach the disk hub from the spindle and shift the module support on the transport means to its position adjacent the loading port. The module can be withdrawn from the module support manually and another substituted for it, and the foregoing loading procedure repeated.

The preferred support feature on the module housing comprises two pairs of projecting pins, each pair carried spaced apart from each other on one of a pair of uniformly spaced apart vertical walls on top of the housing. The module support has a pair of horizontally-facing slots at its top, uniformly spaced apart a distance to allow the two pairs of projections to be slipped into them and support the module. The disk hub is exposed through an opening in the bottom of the housing. Its preferred spindle attachment feature is ferrous construction and a flat surface allowing a cup magnet carried by the spindle to firmly secure the hub to the spindle. Centering is accomplished by a cone and ball device. When a module is not in use within a drive unit, its openings are covered by a dust shield which prevents contamination from entering the module. While in the unit, a lip around the upper edge of the module seals with a shroud within the unit to prevent contamination during this time.

Accordingly, one purpose of this invention is to allow a disk memory module to be front loaded into its drive unit.

Another purpose is to provide such a drive with a sealed interior.

A third purpose is to provide a door sealing the loading port for the module whose opening and closing provides the force for unloading and loading the module from the drive spindle.

Still another purpose is to permit stacking of such drive units one on another.

Another purpose is to reduce the total volume required for the drive unit.

One more purpose is to provide a second stage of sealing of the interior of the module when within the drive unit.

DESCRIPTION OF THE PREFERRED EMBODIMENT

Figure 1:
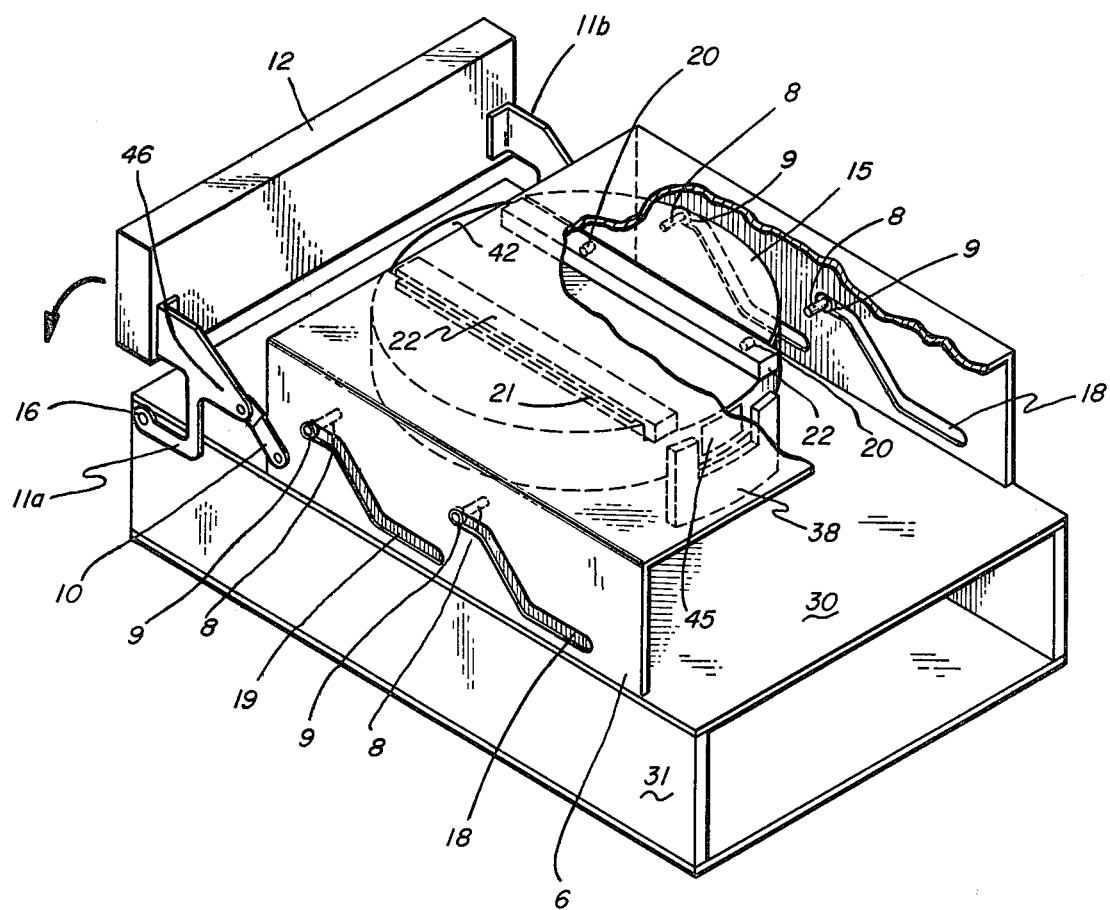
FIG. 1 is a rear perspective sketch of the transport mechanism positioned with the loading port door closed and the module mounted on the spindle. The front panel has been omitted.
Figure 3:
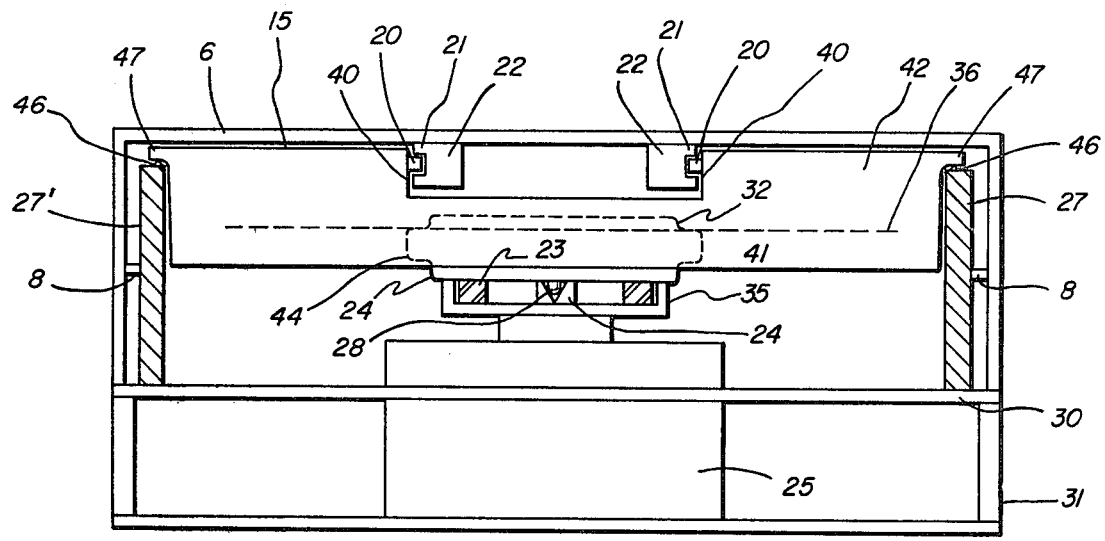
FIG. 3 is a front view of the drive unit with the front panel removed, exposing elements relating to this invention and visible from this view.
Figure 4:
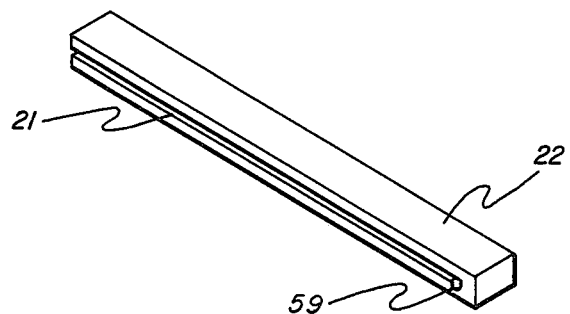
FIG. 4 is a perspective view of one of the slotted rails which supports the module within the drive unit.
Figure 5:
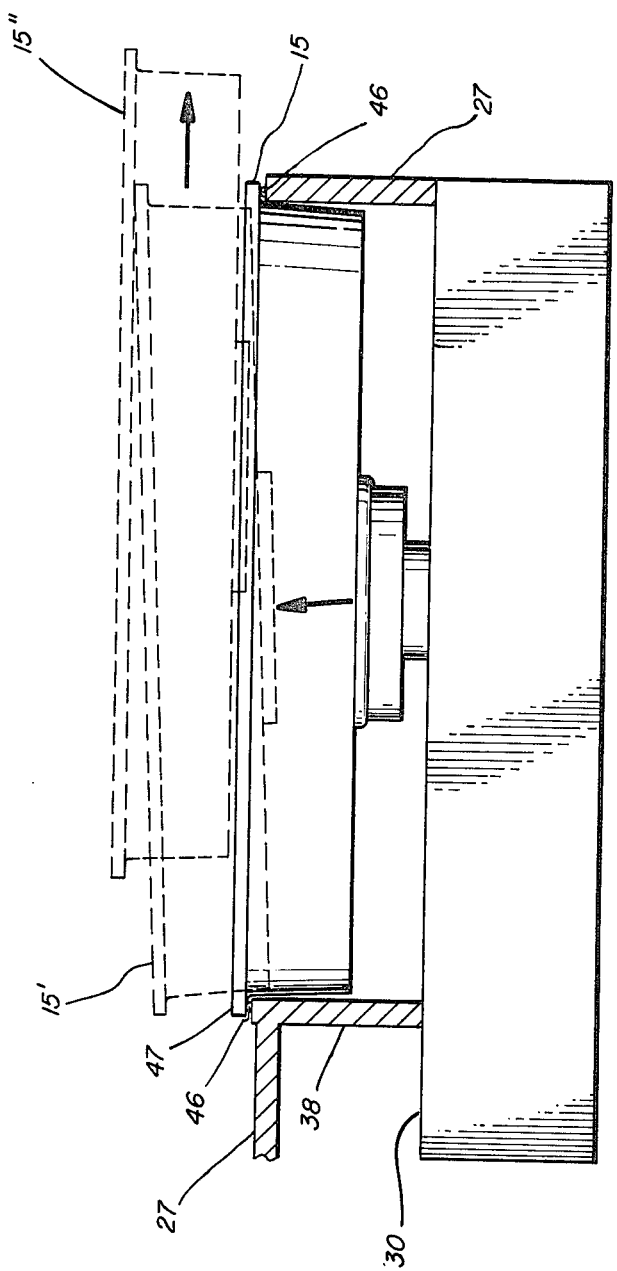
FIG. 5 is a sketch of a side view of the drive unit showing the module's path during opening of the loading port door.

The mechanism as shown in all the FIGS. in a commercial embodiment is enclosed in a dust tight case or plenum, not shown, but of which front panel 33 (FIG. 2) may form a part. Referring first to FIGS. 1 and 3, the module loading apparatus is shown with module 15 mounted on drive unit 30's spindle 35. In this position, module 15 is shown in FIG. 1 slid as far to the right as possible. Housing 42 of module 15 is supported by pins 20 set in vertical walls 40 and which rest on slots 21 of rails 22. Rails 22 (one of which is shown in FIG. 4) are permanently attached to module support 6. The rotating elements of module 15 are supported by spindle 35 in a position which lifts them clear of all portions of the interior of housing 42. Disk 36 is supported by hub 24, and clamped thereto by ring 32. Hub 24 is centered on spindle 35 by hemisphere 28 which mates with the conical depression in the center projection 29 of spindle 35. Hub 24 is clamped to spindle 35 by means of cup magnet 23. In this position, motor 25 can rotate disc 36 allowing heads (not shown) to transduce data on the surface of disc 36. Head access is through port 45 at the rear of module 15. Shroud 27 (FIGS. 3 and 5) surrounds the mounted module 15, seal 46 pressing against lip 47 to exclude dust. An opening in the shroud allows head access.

Figure 2:
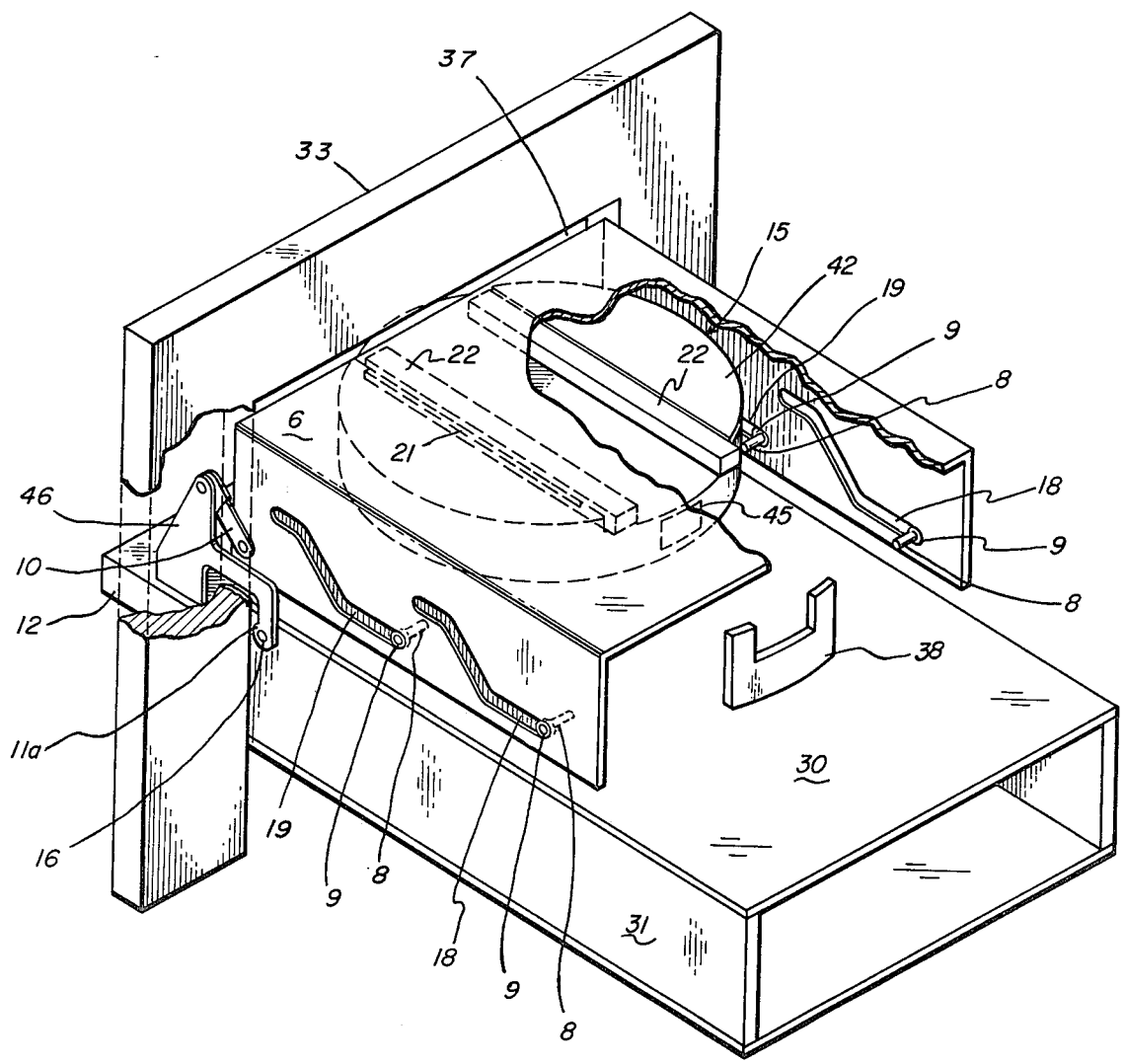
FIG. 2 discloses a view similar to that of FIG. 1, but with the loading port door open with the module support shifted to its position adjacent the loading port.

As shown in FIGS. 1 and 2, loading port door 12 is supported by similarly "U" shaped with a projecting arm 46, or "Y" shaped, pivot arms 11a and 11b. One of the 2 upper arms of each Y or U is pivotably attached to base 31 adjacent the bottom lip of loading port 37. The other of each is fixedly attached to door 12 at opposite ends. This design permits arms 11a and 11b to fit over the lip of port 37 without interference. To remove module 15 from the drive unit, door 12 is pivoted counterclockwise on pin 16 (and its hidden counterpart for arm 11b) from the vertical position shown in FIG. 1 toward the horizontal position shown in FIG. 2. Linkage bar 10 is pivotably attached both to module support 6 and projecting bottom arm 46 of "Y" shaped pivot arm 11a. A second linkage bar, hidden in all the FIGS. but identical to bar 10, connects support 6 to arm 11b. Counterclockwise rotation of door 12 thus causes leftward movement of support 6. Bearings 9 in the background (of FIGS. 1 and 2) are free to rotate on projecting shafts 8, which preferably are carried on the exterior of shroud 27 as shown in FIG. 3. Bearings 9 in the foreground are similarly free to rotate on shafts 8 and are carried by shroud 27 shown with reference number 27' in FIG. 3. Shroud 27 encloses the sides of the mounted module 15 and is rigidly attached to base plate 30 about most of its periphery to prevent dust from entering.

Bearings 9 at all times support module support 6 and restrict its motion to the path predetermined by slots 18 and 19. Leftward motion of support 6 from the position of FIG. 1 causes bearings 9 to roll in slots 18 and 19, shifting support 6 diagonally upward. This movement causes rails 22 to slide leftward with respect to pins 20 and produces force transmitted through housing 42 to flange 44 of hub 24 which overcomes the attraction of magnet 23 to hub 24. Module 15 is thus broken free of magnet 23 and is supported solely by support 6 as soon as it has been lifted. It is advantageous for the corresponding intersections of the diagonal with the horizontal portions of slots 19 be spaced farther from the same intersection of corresponding slots 18 than is the spacing between bearings 9 in these slots, as shown. This allows the attraction of magnet 23 to hub 24 to be broken at the side of module 15 adjacent port 37 first, greatly reducing the force needed.

Continued counterclockwise rotation of door 12 causes support 6 to be lifted vertically and shifted leftwardly on bearings 9 with two of pins 20 entering detents 39 to finally reach the position shown in FIG. 2. Module 15 is then projecting slightly from loading port 37 where it can be easily slid to the left, pins 20 slipping from dentents 39 and slots 21 in rail 22 to remove the entire module from the drive. The upper arms of the "Y"s of pivot arms 11a and 11b can be seen straddling the lower lip of port 37.

When the apparatus is in the position of FIG. 2 with module 15 removed, another similar module may be inserted in the drive. Such a module 15 is maneuvered until rightmost pins 20 slip into slots 21. Module 15 is pushed rightwardly therein until the leftmost pins 20 can be similarly slipped into slots 21 and module 15, now fully supported by module support 6 through rails 22, is slipped rightwardly to the ends of slots 21. Detent depressions 39 prevent shifting of pins 20 in slots 21 during the first part of module 15's travel on support 6. Door 12 is then rotated clockwise on pivot 16 and support 6 slips rightwardly supported by bearings 9 rotating on shafts 8, see FIG. 5. When the diagonal portions of slots 18 and 19 reach bearings 9, module 15 begins a downward and rightward motion toward spindle 35. However, it is desirable that the leading end (that inserted first into port 37) of module 15 pitch down during module mounting, causing a small amount of rotation of module 15 about its transverse diameter, when bearings 9 first reach slots 18 and 19. This can be accomplished either by letting diagonal parts of slots 18 reach bearings 9 before slots 19 do, by having the diagonal parts of slots 18 steeper, or by combining these two approaches. The preferred approach, shown in FIGS. 1 and 2, is to design the diagonal parts of slots 18 to encounter the associated bearings 9 before the diagonal parts of slots 19 encounter theirs, during module mounting.

In the preferred embodiment, as module 15 is shifted toward the mounted position, it encounters a stop 38 which halts horizontal movement of module 15 when it is directly above its mounted position. Further movement of support 6 rightwardly allows module 15 to drop down, by virtue of pins 20 sliding leftwardly in slots 21, into its mounted position with hub 24 supported by spindle 35. Since it is preferred that stop 38 comprise a part of shroud 27, which mates with flanged lip 47, the leading end of module 15 must pitch down to reliably contact stop 38, hence the aforementioned relationship between the diagonal parts of slots 18 and 19. When hub 24 nears magnet 23, the attractive force between them seats hub 24 on spindle 35. There is sufficient accuracy in the fit of hub 24 in the hub opening of housing 42 and in the tolerances of the transport mechanism for hub 24 to accurately center itself on spindle 35 using hemisphere 28's camming on the conical depression in projection 29. Completing the travel of support 6 in slots 18 and 19 shifts housing 42 vertically downwards and pitches it up to a horizontal position where the rotating elements of module 15 are totally clear of housing 42. To assure accurate guiding of module 15 during horizontal movement of it, detents 39 restrain module 15 in a fixed position relative support 6 until the module contacts stop 38. Then continued motion of support 6 merely allows vertical movement of module 15 as pins 20 leave detents 39 and slide in slots 21.

Further information concerning the relationship between hub 24, its opening in housing 42, the dimensions and positions of hemisphere 28 and the conical depression in projection 29, the strength of magnet 23, and the various coefficients of friction between these various members is discussed in copending application entitled Improvements in Disk Packs, with inventor William Roling, filed Oct. 16, 1978, Ser. No. 951,904, and having a common assignee with this application.

What I claim is:
1. A disk drive unit mechanism for loading on and unloading from the drive spindle of said disk drive unit, a disk memory module of the type having a housing with a support feature, and on its bottom an exposed disk hub with a spindle attachment feature, comprising (a) a base supporting the spindle;
(b) a panel mounted on the base and spaced apart from the spindle, and having on a vertical face thereof a loading port large enough to pass the module;
(c) a door not substantially smaller than the loading port;
(d) hinge means fastening the door to the base adjacent the loading port for allowing said door to pivot from a position closing the loading port to an open position allowing the module to enter the loading port;
(e) a module support means mating with the housing's support feature and suspending the housing thereby;
(f) transport means for conveying the module support from a first position adjacent the loading port which allows the module to be passed through the loading port to be mated by its support feature to the module support, to a second position placing the disk hub adjacent the spindle and allowing the disk hub to be mated by its spindle attachment feature to the spindle, said transport means comprising
(i) a pair of vertical plates attached to the module support means substantially parallel to each other, and spaced apart from each other on opposite sides of the spindle, each of the plates having a pair of slots, each slot having a substantially horizontal part and a diagonal part slanting upward therefrom toward the loading port, and
(ii) four projections fixed to the base one projection engaging each slot to guide the module support between its first and second positions; and
(g) linkage means operatively attached between the door and the module for shifting the module support bidirectionally between its first and second positions respectively as the door is opened and closed.

2. The mechanism of claim 1 wherein the spacing between the corresponding intersections of the diagonal portion with the horizontal portions of each of the pair of slots in each vertical plate is greater than the distance between the respective engaging pair of projections.

3. The mechanism of claim 2, wherein the hinge means further comprises a pair of similar approximately "U" shaped arms, each arm rigidly attached at a first end of the U to points adjacent the opposite sides of the interior surface of the door, and each pivotally attached to the base at the second end of the U about an axis adjacent the port.

4. The mechanism of claim 3, wherein the linkage means comprise a pair of linkage bars each pivotally attached to one "U" shaped arm at a point intermediate the first and second ends and further pivotally attached to the module support.

5. The mechanism of claim 4 wherein the "U" shaped arms each include a projection intermediate the ends generally extending away from the door and forming with each U, an approximate "Y", the linkage arms bars being pivoted on said projections, and wherein the linkage bars are attached to the module support at a point substantially below the projections' pivot points when the door is closed and the module support is in its second position.

6. The mechanism of claim 1, wherein the disc module has a flanged lip extending about its upper periphery, and the drive unit further includes a shroud surrounding and substantially concentric with the spindle, with which the flanged lip sealingly mates when the disc module is in its second position.

7. The mechanism of claim 6, wherein the projections are mounted on the shroud.

8. A disk drive unit mechanism for loading on and unloading from the drive spindle of said disk drive unit, a disk memory module of the type having a housing with a support feature, and on its bottom an exposed disk hub with a spindle attachment feature, said module support feature comprising at least two projections, each carried substantially horizontally on a uniformly spaced apart vertical surface atop the housing, comprising (a) a base supporting the spindle;
(b) a panel mounted on the base and spaced apart from the spindle, and having on a vertical face therof a loading port large enough to pass the module;
(c) a door not substantially smaller than the loading port;
(d) hinge means fastening the door to the base adjacent the loading port for allowing said door to pivot from a position closing the loading port to an open position allowing the module to enter the loading port;
(e) a module support means comprising a pair of spaced apart rails, each containing a slot adapted to slidingly accept the projections on the disc module to cooperatively support the module;
(f) transport means for conveying the module support from a first position adjacent the loading port allowing the module to be passed through the loading port to be mated by its support feature to the module support, to a second position placing the disk hub adjacent the spindle and allowing the disk hub to be mated by its spindle attachment feature to the spindle, wherein the transport means includes stop means fixed to the base for restricting further horizontal movement of the module when the module, while shifting toward its second position reaches a point directly above its second position, by the occurrence of sliding of the projections in the slots; and (g) linkage means operatively attached between the door and the module support for shifting the module support bidirectionally between its first and second positions, respectively shifting into its first and second positions as the door is opened and closed.

9. The mechanism of claim 8, further comprising detent means for retaining the module in a predetermined position relative the module support during the portion of the shifting of the module having a horizontal component.

10. The mechanism of claim 9, wherein the detent means comprises a depression in the bottom of the slot in each rail in which rests the respective projection.

11. The mechanism of claim 8, wherein the disc module has a flanged lip extending about its upper periphery, and the drive unit further includes a shroud surrounding and substantially concentric with the spindle, with which the flanged lip sealingly mates when the module is in its second position.

12. The mechanism of claim 11, wherein the part of the shroud diametrically across the shroud from the loading port, comprises the stop means.

* * * * *